US006282475B1

(12) United States Patent
Washington

(10) Patent No.: US 6,282,475 B1
(45) Date of Patent: Aug. 28, 2001

(54) SYSTEM FOR AUTOMATICALLY ADJUSTABLE DEVICES IN AN AUTOMOTIVE VEHICLE

(76) Inventor: Valdemar L. Washington, 1505 Arrow La., Flint, MI (US) 48857

( * ) Notice: Subject to any disclaimer, the term of this patent is extended or adjusted under 35 U.S.C. 154(b) by 0 days.

(21) Appl. No.: 09/398,903

(22) Filed: Sep. 20, 1999

(51) Int. Cl.$^7$ .................................................. G06F 19/00
(52) U.S. Cl. ............................ 701/49; 701/45; 318/466; 296/65.16
(58) Field of Search ................................... 701/1, 45, 49; 280/735; 307/10.2, 10.5; 318/466, 467; 340/426, 427; 296/65.16

(56) References Cited

U.S. PATENT DOCUMENTS

| | | | |
|---|---|---|---|
| 3,787,025 | 1/1974 | Sturhan | 248/399 |
| 4,204,255 | 5/1980 | Cremer | 364/425 |
| 4,434,468 | 2/1984 | Caddick et al. | 364/424 |
| 4,477,874 | * 10/1984 | Ikuta et al. | 701/49 |
| 4,503,504 | 3/1985 | Suzumura et al. | 364/425 |
| 4,660,140 | 4/1987 | Illg | 364/184 |
| 4,734,693 | 3/1988 | Diuhosch et al. | 340/825.31 |
| 4,797,824 | * 1/1989 | Sugiyama et al. | 701/49 |
| 4,811,226 | * 3/1989 | Shinohara | 701/49 |
| 5,124,920 | * 6/1992 | Tamada et al. | 701/1 |
| 5,155,685 | 10/1992 | Kishi et al. | 364/424.05 |
| 5,164,645 | 11/1992 | Furuse et al. | 318/467 |
| 5,254,924 | * 10/1993 | Ogasawara | 701/49 |
| 5,278,363 | 1/1994 | Krieg et al. | 200/5 R |
| 5,552,789 | 9/1996 | Schuermann | 342/42 |
| 5,581,630 | 12/1996 | Bonneau, Jr. | 382/116 |
| 5,686,765 | 11/1997 | Washington | 307/10.5 |
| 5,715,905 | 2/1998 | Kaman | 180/287 |
| 5,785,347 | * 7/1998 | Adolph et al. | 280/735 |
| 5,812,399 | 9/1998 | Judic et al. | 364/424.05 |
| 5,822,707 | * 10/1998 | Breed et al. | 701/49 |
| 5,845,733 | 12/1998 | Wolfsen | 180/287 |
| 6,029,102 | * 2/2000 | Elsman | 701/1 |
| 6,078,854 | * 6/2000 | Breed et al. | 701/49 |

* cited by examiner

*Primary Examiner*—Gary Chin
(74) *Attorney, Agent, or Firm*—Gifford, Krass, Groh, Sprinkle, Anderson & Citkowski, P.C.

(57) ABSTRACT

A system is described for automatically adjusting various adjustable devices in an automotive vehicle such as the seats, mirrors, pedal positions and the like. The system includes a physiological characteristic scanner which generates an output signal representative of that physiological characteristic of the person seated in the driver seat and, optionally, in the passenger's seat. Such physiological characteristics includes, for example, retinal scanners, fingerprint readers, thermal scanners and the like. The output signal from the physiological characteristic determining device is coupled as an input signal to a processor which also has access to digital memory containing data representing the physiological characteristics of authorized drivers of the automotive vehicle. This memory further includes data representative of the various position(s) of the adjustable device(s) for each authorized driver and optionally passenger of the automotive vehicle. Thus, upon identification of the authorized driver/passenger from his or her physiological data, the processor automatically generates position signals to the various adjustable devices in order to move the adjustable devices to preselected positions suitable for that particular authorized driver or passenger. In one embodiment of the invention, the system also monitors and stores the amount of time spent by the driver or passenger of the vehicle in the vehicle.

5 Claims, 1 Drawing Sheet

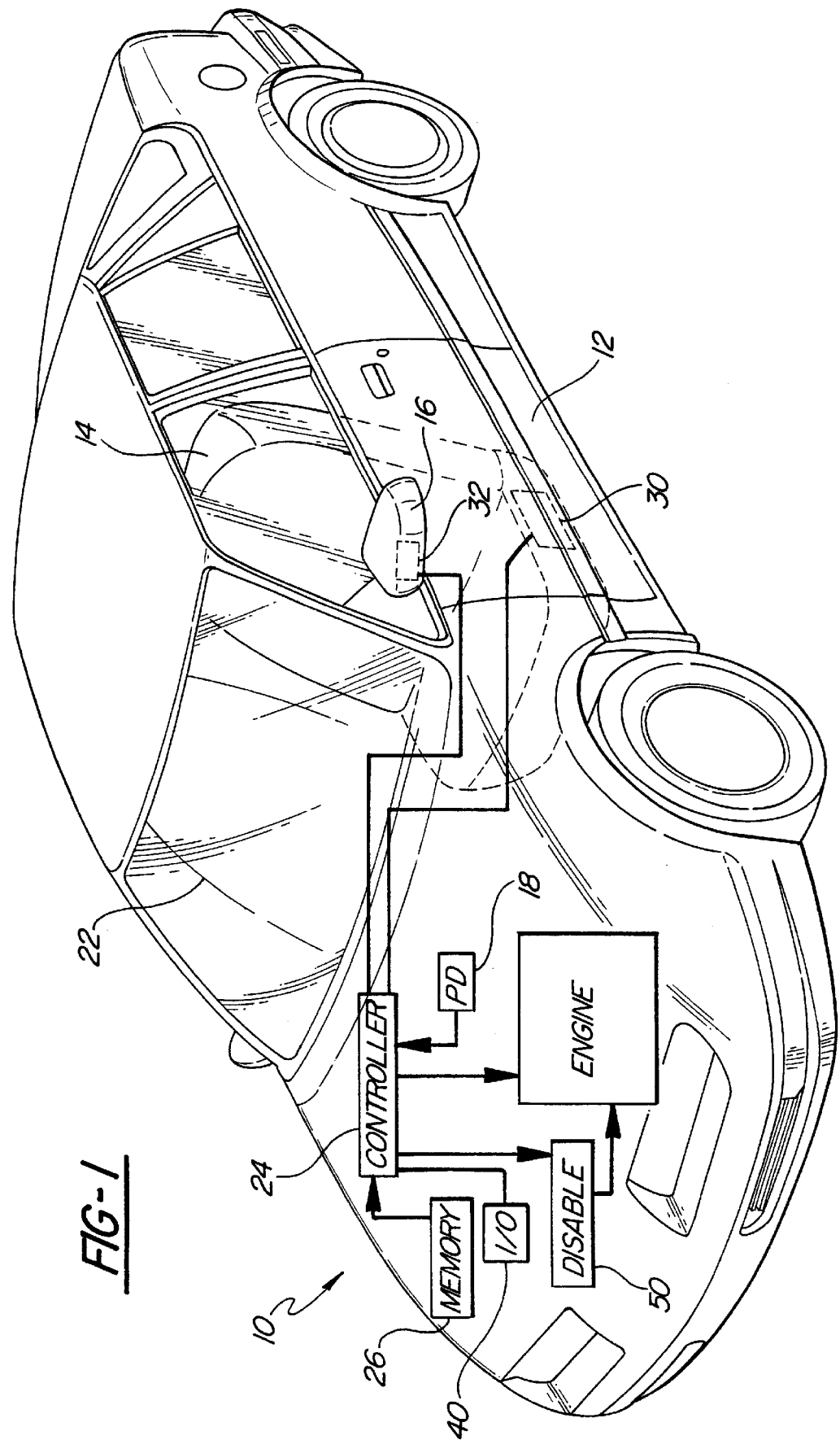

SYSTEM FOR AUTOMATICALLY ADJUSTABLE DEVICES IN AN AUTOMOTIVE VEHICLE

BACKGROUND OF THE INVENTION

I. Field of the Invention

The present invention relates generally to a system for automatically adjusting adjustable devices in an automotive vehicle.

II. Description of the Prior Art

Modern day automotive vehicles contain many powered adjustable devices in order to accommodate different drivers or passengers of different sizes. Such adjustable devices include, for example, an electrically powered car seat, powered external as well as internal mirrors, adjustable vehicle operation pedals and the like.

With these previously known adjustable devices, it has been previously necessary for each different driver to adjust all of the adjustable devices to the position most satisfactory to his or her use. Such adjustment of the adjustable devices not only is time consuming and sometimes confusing, but also difficult to accurately move the adjustable device to the same position with high repeatability. As such, many drivers oftentimes find themselves continually readjusting the adjustable devices during the first thirty or forty minutes of vehicle operation.

Furthermore, in many jurisdictions, student drivers are required to spend a minimum time driving the vehicle with an experienced driver before the licensing agency, typically the state, will issue a permanent driver's license for that individual. Such "practice driving" time is typically spent with the student's parent or guardian.

Previously, there has been no way to confirm with certainty that the student driver has spent the required minimum time in practice sessions driving the vehicle. Rather, it has been the previous practice to merely rely upon an affidavit or other statement by the student driver's parent or guardian that the minimum time in practice driving had been met.

Furthermore, some jurisdictions impose driving curfews for student drivers. Previously, there has been no way of enforcing such curfews.

SUMMARY OF THE PRESENT INVENTION

The present invention provides a system which overcomes all of the above-mentioned disadvantages of the previously known devices.

In brief, the device of the present invention comprises a means for determining a unique physiological characteristic of a person seated in the driver's seat and optionally passenger's seat of the automotive vehicle. Such devices include, for example, retinal scanners, fingerprint readers, thermal scanners and the like, all of which generate an output signal representative of a unique physiological characteristic of the person in the driver or passenger seat.

The output from the physiological characteristic determining means is coupled as an input signal to a processor. The processor also has access to digital memory which contains data of the physiological characteristics of all authorized drivers and/or passengers of the automotive vehicle. Thus, upon receipt of the output signal from the physiological characteristic determining means, the processor identifies the authorized driver or passenger (sometimes collectively referred to as occupant) of the motor vehicle by comparing the output signal with the data contained in the digital memory.

The digital memory also contains data corresponding to the various positions for each of the adjustable devices for each authorized driver and/or passenger of the motor vehicle. Thus, once the driver or passenger is identified, the processor then outputs position signals to the various adjustable devices corresponding to the identified driver or passenger to thereby move the adjustable devices to preset positions to accommodate the driver and/or passenger of the automotive vehicle.

In the preferred embodiment of the invention, the processor also stores in memory, preferably digital memory, the amount of time that certain drivers, typically student drivers, have spent operating the automotive vehicle with an adult, such as the student's parent or guardian. Any conventional means, such as a computer port, is then used to extract the information stored in memory to verify the amount of time spent by the driver operating the automotive vehicle. As such, the system provides a means for verifying that student drivers, as well as other drivers who must meet minimum periods of supervised driving, satisfy the minimum driving requirements.

In a still further preferred embodiment of the invention, the processor, once a student or other restricted driver has been identified, generates output signals to disable the vehicle ignition system whenever the restricted driver attempts to operate the vehicle outside the prescribed operating hours, at least in the absence of an adult passenger in the passenger seat.

BRIEF DESCRIPTION OF THE DRAWING

FIG. 1 is a diagrammatic block view illustrating a preferred embodiment of the system of the present invention.

DETAILED DESCRIPTION OF A PREFERRED EMBODIMENT OF THE PRESENT INVENTION

With reference to the drawing, a preferred embodiment of the system 10 of the present invention is there shown for use with an automotive vehicle 12. The automotive vehicle 12 includes at least one, and preferably several, adjustable devices such as an electrically powered seat 14, electrically powered mirrors 16, and the like. Each of these adjustable devices 14 and 16 move to one of at least two different positions in response to predetermined position signals.

The adjustable devices 14 and 16 illustrated in the drawing are by way of example only. Other such adjustable devices include, without limitation, interior mirrors, brake pedal and accelerator pedals, driver wheel position and the like.

The system 10 includes a physiological characteristic determining means 18 which generates an output signal on its output 20 representative of a physiological characteristic of a person seated in the driver's seat 14 or optionally in the passenger's seat 22. Such physiological determining means 18 can comprise, for example, a retina scanner, iris scanner, fingerprint reader, thermal scanner and the like. In each case, however, the output signal from the means 18 is unique for each authorized driver or passenger of the automotive vehicle 12.

The output from the physiological characteristic determining means 18 is fed as an input signal to a controller 24. The controller 24 is preferably microprocessor based and includes access to data stored in digital memory 26. Such data includes the physiological characteristics of data for all authorized drivers and/or passengers of the automotive vehicle 12. Thus, the controller 24, by comparing the output signal from the determining means 18 with the data stored in memory 26, is able to identify the driver or passenger of the motor vehicle by his or her physiological characteristic.

The memory 26 also contains data corresponding to the desired position for each adjustment device 14 for each authorized driver or passenger. Thus, once the driver or occupant of the motor vehicle 12 has been identified by his or her physiological characteristics, the controller 24 then generates position signals on its output lines 30 and 32 to move the adjustable devices 14 and 16, respectively, to the desired position represented in the digital memory 28 for the identified driver or occupant in order to accommodate that particular driver or passenger. Typically, if the physiological characteristic is used to identify the passenger, only adjustable devices associated with the passenger, such as the position of the passenger seat, are actuated.

Thus, in operation, as a driver or passenger sits in the vehicle seat 14 and attempts to activate the vehicle ignition, the physiological characteristic determining means 18 generates an output signal to the controller 24 representative of the physiological characteristic of the driver and optionally also of the passenger. The controller 24 then, by examining data stored in the digital memory 28, identifies the particular driver or passenger by his or her physiological characteristic. Once that driver and optionally passenger has been identified, the controller generates position signals to the various adjustable devices 14 and 16 in order to activate the adjustable devices 14 and 16 to move to preselected positions in order to accommodate the identified driver or passenger.

Since the system of the present invention automatically moves all of the adjustable devices in the automotive vehicle 12 to preset positions for each individual driver or passenger, all of the previously known disadvantages of readjusting the adjustable devices is eliminated.

The system of the present invention, in one embodiment, is also programmed to monitor and store the amount of time spent by predetermined drivers, such as student drivers or other drivers who require minimum periods of supervised driving experience, have operated the motor vehicle. In this case, once the physiological characteristics determining 18 identifies the driver for which the amount of vehicle operation time should be recorded, stores data in digital memory representative of the amount of time that the automotive vehicle was operated by such student or other driver. Subsequently, this data can be retrieved through a computer port 40 having access to the memory 26 to verify that the minimum vehicle operating time of the student, or other persons who require minimum periods of supervised driving, have been met.

In still a further embodiment, the controller 24, once a restricted or student driver has been identified as the vehicle operator, determines if the attempted vehicle operation is within prescribed time periods, i.e. within the curfew stored in memory. In the event that such a restricted driver attempts to operate the vehicle, at least in the absence of an adult passenger, the controller 24 generates a vehicle disable signal to an ignition disable circuit 50 which disables the vehicle ignition and prevents operation of the vehicle.

Having described my invention, however, many modifications thereto will become apparent to those skilled in the art to which it pertains without deviation from the spirit of the invention as defined by the scope of the appended claims.

I claim:

1. For use with an automotive vehicle having at least one adjustable device to facilitate operation of the vehicle by different drivers, said adjustable device being movable between at least two different positions in response to a predetermined position signal, a system for automatically moving said at least one adjustable device between said at least two different positions comprising:

means for determining an exclusively unique physiological characteristic of a person seated in the seat of the vehicle and for generating an output signal representative of said physiological characteristic, memory means containing data corresponding to physiological characteristics of at least one authorized occupant of the automotive vehicle, said memory means further containing data representative of at least one occupant position of said at least one adjustable device for said at least one authorized occupant of the automotive vehicle, said at least one occupant position being between and including said at least two different positions of said at least one adjustable device, means for comparing said output signal with said exclusively unique physiological characteristic data in said memory means and for generating an occupant identification signal in response thereto, means responsive to said occupant identification signal for generating said at least one ocupant position signal to said at least one adjustable device corresponding to said occupant identification signal, wherein said determining means comprises at least one of a retina scanner, an iris scanner, a fingerprint reader, a thermal scanner, and a voice recognition device.

2. The invention as defined in claim 1 wherein said adjustment device comprises a powered seat.

3. The invention as defined in claim 1 wherein said adjustment device comprises a powered mirror.

4. The invention as defined in claim 1 and comprising means for storing data in said memory means representative of the amount of time of vehicle operation by preselected persons.

5. The invention as defined in claim 4 and comprising an output port for extracting said data representative of the amount of time of vehicle operation by said preselected persons.

* * * * *